(12) United States Patent
Moore et al.

(10) Patent No.: US 12,147,796 B2
(45) Date of Patent: Nov. 19, 2024

(54) DEPLOYMENT ROUTING OF CLIENTS BY ANALYTICS

(71) Applicant: Citrix Systems, Inc., Fort Lauderdale, FL (US)

(72) Inventors: Timothy Jay Moore, Pompano Beach, FL (US); Nicholas Walter Siryk, Boca Raton, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 471 days.

(21) Appl. No.: 17/215,426

(22) Filed: Mar. 29, 2021

(65) Prior Publication Data
US 2021/0216303 A1    Jul. 15, 2021

Related U.S. Application Data

(63) Continuation of application No. 15/815,615, filed on Nov. 16, 2017, now Pat. No. 10,963,238.

(51) Int. Cl.
| | |
|---|---|
| *G06F 9/445* | (2018.01) |
| *G06F 8/65* | (2018.01) |
| *G06F 11/30* | (2006.01) |
| *G06F 11/34* | (2006.01) |
| *G06F 21/57* | (2013.01) |

(Continued)

(52) U.S. Cl.
CPC ............ *G06F 8/65* (2013.01); *G06F 11/3006* (2013.01); *G06F 11/3055* (2013.01); *G06F 11/3452* (2013.01); *G06F 21/57* (2013.01); *H04L 41/082* (2013.01); *H04L 43/065* (2013.01); *G06F 8/71* (2013.01); *H04L 67/34* (2013.01)

(58) Field of Classification Search
CPC .... G06F 8/65; G06F 11/3006; G06F 11/3055; G06F 11/3452; G06F 21/57; G06F 8/71; H04L 41/082; H04L 43/065; H04L 67/34
USPC ................................................ 717/168–178
See application file for complete search history.

(56) References Cited

U.S. PATENT DOCUMENTS

| | | |
|---|---|---|
| 7,584,467 B2 | 9/2009 | Wickham et al. |
| 9,092,296 B1 | 7/2015 | Nay et al. |

(Continued)

OTHER PUBLICATIONS

Examination Report on AU Appl. No. 2018367400 dated Sep. 11, 2020.

(Continued)

*Primary Examiner* — Chuck O Kendall

(57) ABSTRACT

Described embodiments provide deployment of updates to multiple clients. A device may provide, to each client of a first plurality of clients, a software update to be executed at the client. The device can transmit, subsequent to providing the software update, to each of the first plurality of clients, a request to check a status of the client. The device can receive from at least one of the first plurality of clients, a response to the request indicative of operational health of the client subsequent to providing the software update to the client. The device determines an operational health statistic of the first plurality of clients subsequent to providing the software update to the first plurality of clients and provides, to each client of a second plurality of clients, the software update to be executed at each client responsive to determining that the operational health statistic satisfies a predetermined threshold.

17 Claims, 4 Drawing Sheets

(51) Int. Cl.
    *H04L 41/082*     (2022.01)
    *H04L 43/065*     (2022.01)
    *G06F 8/71*     (2018.01)
    *H04L 67/00*     (2022.01)

(56) References Cited

U.S. PATENT DOCUMENTS

| | | |
|---|---|---|
| 9,229,902 B1 | 1/2016 | Leis et al. |
| 9,311,066 B1 * | 4/2016 | Garman ................ H04L 43/08 |
| 9,319,857 B2 | 4/2016 | Cooke et al. |
| 9,696,982 B1 | 7/2017 | Michalik et al. |
| 10,019,255 B1 | 7/2018 | Greenfield et al. |
| 10,719,427 B1 | 7/2020 | Arguelles et al. |
| 2012/0259793 A1 | 10/2012 | Umansky et al. |
| 2012/0266155 A1 | 10/2012 | Valeriano et al. |
| 2013/0054682 A1 | 2/2013 | Malik et al. |
| 2013/0297802 A1 | 11/2013 | Laribi et al. |
| 2016/0026452 A1 | 1/2016 | Dani et al. |
| 2016/0232022 A1 | 8/2016 | Kania et al. |
| 2016/0350098 A1 | 12/2016 | Kuchibhotla et al. |
| 2017/0046146 A1 | 2/2017 | Jamjoom et al. |
| 2017/0115978 A1 | 4/2017 | Modi et al. |
| 2017/0163769 A1 | 6/2017 | Kataria et al. |
| 2017/0212799 A1 | 7/2017 | Konireddygari |
| 2017/0250882 A1 | 8/2017 | Kellicker |
| 2017/0366586 A1 | 12/2017 | Bloesch et al. |
| 2018/0007121 A1 | 1/2018 | Krishnan et al. |
| 2018/0121322 A1 | 5/2018 | Reyes et al. |
| 2018/0129546 A1 | 5/2018 | Mullins et al. |
| 2018/0189046 A1 | 7/2018 | Kunisetty et al. |
| 2018/0203736 A1 | 7/2018 | Vyas et al. |
| 2019/0146774 A1 * | 5/2019 | Moore ................ H04L 41/082 717/172 |
| 2019/0250949 A1 | 8/2019 | Chen et al. |
| 2020/0241862 A1 | 7/2020 | Oruganti et al. |

OTHER PUBLICATIONS

Final Office Action on U.S. Appl. No. 15/815,615 dated Jul. 28, 2020.
Final Office Action on U.S. Appl. No. 15/815,615 dated Nov. 13, 2019.
International Preliminary Report Patentabilty on International Appl. No. PCT/US2018/059011 mailed May 28, 2020.
International Search Report and Written Opinion for Int. Appl. No. PCT/US2018/059011, mailed on Feb. 12, 2019.
Non-Final Office Action on U.S. Appl. No. 15/815,615 dated Feb. 21, 2020.
Non-Final Office Action on U.S. Appl. No. 15/815,615 dated May 2, 2019.
Non-Final Office Action on U.S. Appl. No. 15/815,615 dated Sep. 14, 2018.
Notice of Allowance on U.S. Appl. No. 15/815,615 dated Dec. 2, 2020.
Examination Report on EP Appl. No. 18808571.6 dated May 31, 2021.
Office Action on CA Appl. No. 3082025 dated Jul. 12, 2021.
Examination Report on EP Appl. No. 18808571.6 dated Oct. 31, 2022.

* cited by examiner

DEPLOYMENT ROUTING OF CLIENTS BY ANALYTICS

CROSS-REFERENCE TO RELATED APPLICATION

This application is a continuation of and claims priority to and the benefit of U.S. patent application Ser. No. 15/815,615, titled "DEPLOYMENT ROUTING OF CLIENTS BY ANALYTICS," and filed on Nov. 16, 2017, the contents of all of which are hereby incorporated herein by reference in its entirety for all purposes.

FIELD OF THE DISCLOSURE

The present application generally relates to distributing updates (e.g., software updates or hardware updates). In particular, the present application relates to systems and methods for deploying software updates to multiple clients.

BACKGROUND

Under canary deployment schemes, incremental updates to an application may be tested by deploying a new version of an application side-by-side with a production version of the application to a multitude of clients. A different version of the application may be provided to one subset of clients, whereas a production version of the application may be provided to another subset of clients. In current distribution algorithms, the subset of clients to be provided with the new version of the application may be chosen based on complaints actively reported by the clients provided with the different version of the application or at random.

BRIEF SUMMARY

The present disclosure is directed towards systems and methods for deploying software updates to multiple clients. The updates can include a software update, such as an update to application instances previously deployed or executing on computing devices corresponding to the multiple entities. The update may be an update to provide additional features, remove existing features, add, remove or modify parameter settings, among others. In some embodiments, the updates can include an update to hardware corresponding to devices of the entities or a combination of an update to the software and hardware.

In canary deployment services, a new, pilot, or otherwise test version of an application may be provided to one subset of clients, whereas a production version of the application may remain in operation on another subset of clients. The update may be deployed via a computer network, including a local area network or a wide area network, or via the internet. In some embodiments, the update may be deployed via a cloud-based service. As the test version of the application may be distributed to the subset of clients, any adverse impact therefrom may be limited to the subset and any change arising from the test version may be reversed.

Each client may have different hardware configurations with varying processing power, memory space, graphic rendering capabilities, and network connectivity, among others. In addition, each client may have different software configurations with vary operating systems, device drivers, virtualization capabilities, and other routines and processes interfacing with the application, among others. Due to the variations in hardware and/or software configuration, the operational stability of each client may differ in response to the installation of the new update. As such, some clients may run the new version of the application without any adverse effects, while other clients may undergo degradation in computing performance. Selecting which clients to provide newer versions of the application at random may result in degradation in performance at some clients. Additionally, customer complaint reports may not objectively reflect computer performance at clients, and may thus also result in suboptimal selection of clients to provide newer versions of the application.

To reduce degradation in computer performance and minimize any other adverse impact from the newer versions of the application, the present systems and methods provide for a canary deployment distribution based on operation statistics and analytics of the recipient clients. In accordance to a distribution schedule, the canary deployment system may query a first set of clients for an operational health statistic. Each of the first set of clients may have already received and installed a new version of the application. Upon receipt of the query, each client of the first set of clients may determine the operational health statistic by identifying various properties of invocations of predetermined callbacks (e.g., web hooks using HTTP POST) for the newly updated application. Such various properties for each predetermined callback may include a number of invocations, a number of errors, and a completion time, among others. These properties may be indicative of the operational health statistic of the client of the first set of clients. Once determined, each client of the first set of clients may send a response including the operational health statistic to the canary deployment system.

Using the operational health statistic compiled from the first set of clients, the canary deployment system may determine whether to push the newer version of the application to a second set of clients. The canary deployment system may calculate an operational health statistic indicative of the aggregate operational statistic for the first set of clients that have already received and installed the new version of the application. The canary deployment system may then compare the operational health statistic indicative of the aggregate operational statistic for the first set of clients to a health threshold. If the operational health statistic is greater than the health threshold signifying a lack of adverse effects from the new version of the application, the canary deployment system may provide the new version to the second set of clients. The canary deployment system may also increment a deployment counter to the next set of clients. If the operational health statistic is lower than or equal to the health threshold signifying an existence of adverse effects from the new version of the application, the canary deployment system may withhold distribution of the new version to the second set of clients and signal an alert to an administrator. The canary deployment system may also wait until the next designated time in accordance to the distribution schedule to determine whether to push the newer version.

At least one aspect of this disclosure is directed to a method of deploying software updates. A device having one or more processors may provide, to each client of a first plurality of clients, a software update to be executed at the client. The device may transmit, subsequent to providing the software update, to each client of the first plurality of clients, a request to check a status of the client. The device may receive, from at least one client of the first plurality of clients, a response to the request indicative of operational health of the client subsequent to providing the software update to the client. The device may, based on the at least one response received from the at least one client of the first plurality of clients, an operational health statistic of the first plurality of clients subsequent to providing the software update to each client of the first plurality of clients. The device may provide, to each client of a second plurality of clients, the software update to be executed at each client responsive to determining that the operational health statistic satisfies a predetermined threshold.

In some embodiments, the device may determine a second operational health statistic indicative of an operational health of the second plurality of clients based on responses received from at least one client of the second plurality of clients. In some embodiments, the device may provide, responsive to determining that the second operational health statistic does not satisfy the predetermined threshold, an alert to an administrator.

In some embodiments, the device may determine a second operational health statistic indicative of an operational health of the second plurality of clients based on responses received from at least one client of the second plurality of clients. In some embodiments, the device may modify a distribution schedule for providing the software update, responsive to determining that the second operational health statistic does not satisfy the predetermined threshold.

In some embodiments, the device may determine that a current time satisfies one of a plurality of times specified by a distribution schedule. In some embodiments, transmitting the request to check the status of each client may further include transmitting the request to check the status of each client, responsive to determining that the current time satisfies one of the plurality of times specified by the distribution schedule.

In some embodiments, the device may identify a third operational health statistic indicative of an operational health of a third plurality of clients, each client of the third plurality of clients provided with the software update prior to each client of the first plurality of clients. In some embodiments, the device may determine the predetermined threshold based on the third operational health statistic of the third plurality of clients.

In some embodiments, determining the operational health statistic of the first plurality of clients may further include identifying a number of invocations, a number of errors, and a completion time for a predetermined callback at the at least one client of the first plurality of clients. In some embodiments, determining the operational health statistic of the first plurality of clients may further include identifying one or more invocations of a predetermined callback at the at least one client of the first plurality of clients. The predetermined callback may include a web hook triggered responsive to satisfying of a predetermined condition.

In some embodiments, determining the operational health statistic may further include aggregating the plurality of responses from the first plurality of clients, each response to the request indicating the operational health of each client in executing the software update at each client. In some embodiments, providing the software update to each client of the second plurality of clients may further include incrementing a deployment counter corresponding to a number of pluralities of clients provided with the software update, responsive to determining that the operational health statistic satisfies the predetermined threshold.

In some embodiments, providing the software update to each client of the second plurality of clients may further include incrementing a deployment counter corresponding to a number of pluralities of clients provided with the software update, responsive to determining that the operational health statistic satisfies the predetermined threshold. In some embodiments, providing the software update to be executed at each client may further include invoking a software deployment service to perform deployment of software at each client of the first plurality of clients or the second plurality of clients.

Another aspect of this disclosure is directed to a system for deploying software updates. The system may include an update distributor executable on a device having one or more processors. The update distributor may provide, to each client of a first plurality of clients, a software update to be executed at each client. The system may include a status checker executable on the device. The status checker may transmit, subsequent to providing the software update, to each client of the first plurality of clients, a request to check a status of each client. The status checker may receive, from at least one client of the first plurality of clients, a response to the request indicative of operational health of the at least one client subsequent to the provision of the software update to the at least one client. The system may include a performance evaluator executable on the device. The performance evaluator may determine, based on the at least one response received from the at least one client of the first plurality of clients, an operational health statistic of the first plurality of clients subsequent to providing the software update to each client of the first plurality of clients. The update distributor may provide, to each client of a second plurality of clients, the software update to be executed at each client responsive to the determination that the operational health statistic satisfies a predetermined threshold.

In some embodiments, the performance evaluator may determine a second operational health statistic indicative of an operational health of the second plurality of clients based on responses received from at least one client of the second plurality of clients. In some embodiments, the update distributor may provide, responsive to the determination that the second operational health statistic does not satisfy the predetermined threshold, an alert to an administrator.

In some embodiments, the performance evaluator may determine a second operational health statistic indicative of an operational health of the second plurality of clients based on responses received from at least one client of the second plurality of clients. In some embodiments, the update distributor may modify a distribution schedule for providing the software update, responsive to the determination that the second operational health statistic does not satisfy the predetermined threshold.

In some embodiments, the update distributor may determine that a current time satisfies one of a plurality of times specified by a distribution schedule. In some embodiments, the status checker may transmit the request to check the status of each client, responsive to the determination that the current time satisfies one of the plurality of times specified by the distribution schedule.

In some embodiments, the performance evaluator may determine a previous operational health statistic indicative of an operational health of a third plurality of clients, each client of the third plurality of clients provided with the software update prior to each client of the first plurality of clients. In some embodiments, the performance evaluator may determine that the predetermined threshold based on the previous operational health statistic of the third plurality of clients.

In some embodiments, the performance evaluator may determine the operational health statistic of the first plurality of clients by identifying a number of invocations, a number of errors, and a completion time for a predetermined callback at the at least one client of the first plurality of clients. In some embodiments, the performance evaluator may determine the operational health statistic of the first plurality of clients by identifying one or more invocations of a predetermined callback at the at least one client of the first plurality of clients. The predetermined callback may include a web hook triggered responsive to satisfying of a predetermined condition.

In some embodiments, the status checker may aggregate the plurality of responses from the first plurality of clients, each response to the request indicating the operational health of each client in executing the software update at each client. In some embodiments, the update distributor may increment a deployment counter corresponding to a number of pluralities of clients provided with the software update, responsive to the determination that the operational health statistic satisfies the predetermined threshold. In some embodiments, the update distributor may invoke a separate software deployment service to perform deployment of software at each client of the first plurality of clients or the second plurality of clients.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1:
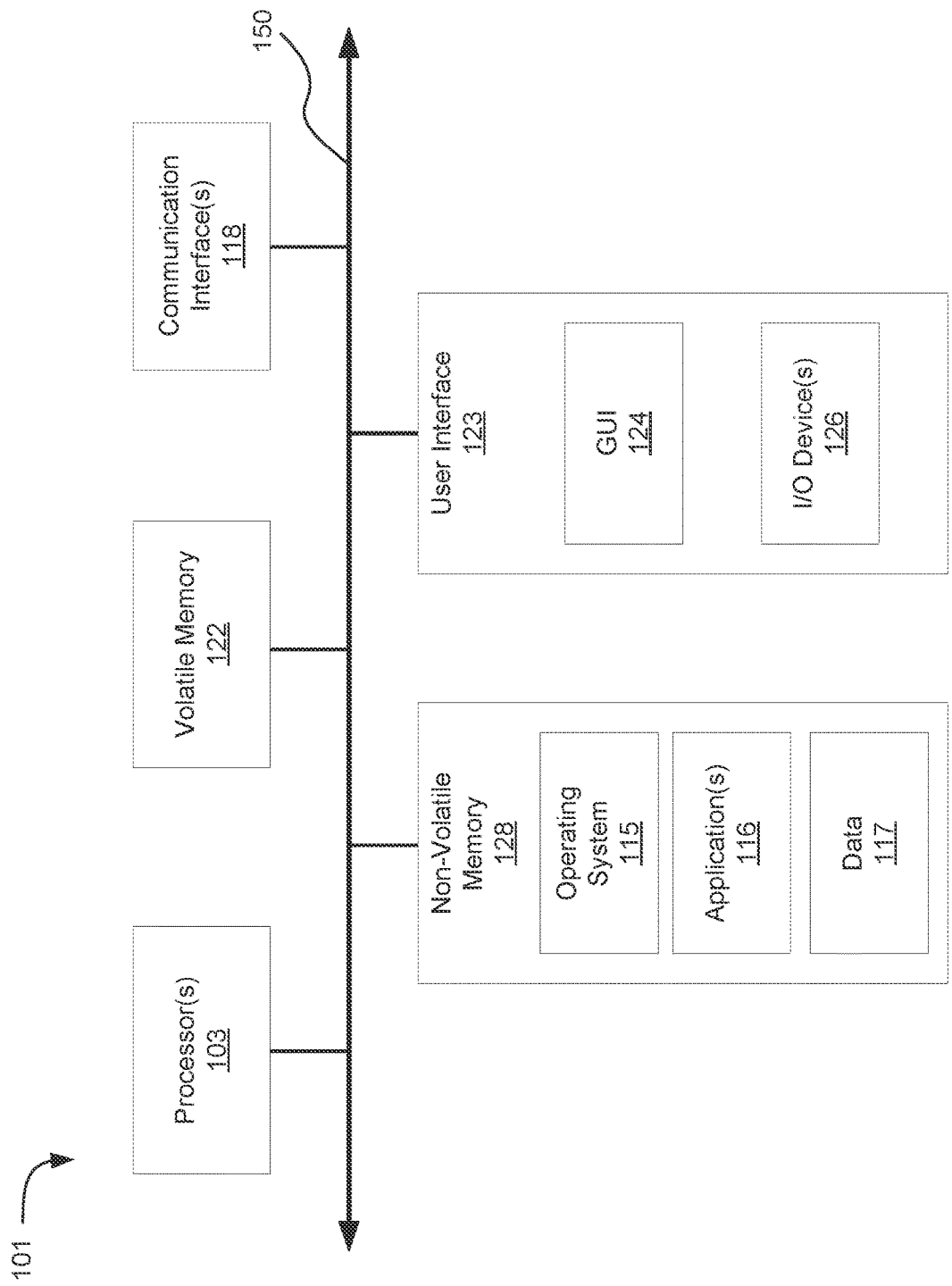
FIG. 1 is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes systems and methods for deploying software updates to multiple clients.

A. Computing Environment

Prior to discussing the specifics of embodiments of the systems and methods of an appliance and/or client, it may be helpful to discuss the computing environments in which such embodiments may be deployed.

As shown in FIG. 1, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1 is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, the computing device 101 may execute an application on behalf of a user of a client computing device, may execute a virtual machine, which provides an execution session within which applications execute on behalf of a user or a client computing device, such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, FL, the teachings of which are hereby incorporated herein by reference.

B. Deploying Software Updates to Multiple Clients

The present disclosure is directed towards systems and methods for deploying software updates to multiple clients. The updates can include a software update, such as an update to application instances previously deployed or executing on computing devices corresponding to the multiple entities. The update may be an update to provide additional features, remove existing features, add, remove or modify parameter settings, among others. In some embodiments, the updates can include an update to hardware corresponding to devices of the entities or a combination of an update to the software and hardware.

In canary deployment services, a new, pilot, or otherwise test version of an application may be provided to one subset of clients, whereas a production version of the application may remain in operation on another subset of clients. The update may be deployed via a computer network, including a local area network or a wide area network, or via the internet. In some embodiments, the update may be deployed via a cloud-based service. As the test version of the application may be distributed to the subset of clients, any adverse impact therefrom may be limited to the subset and any change arising from the test version may be reversed.

Each client may have different hardware configurations with varying processing power, memory space, graphic rendering capabilities, and network connectivity, among others. In addition, each client may have different software configurations with vary operating systems, device drivers, virtualization capabilities, and other routines and processes interfacing with the application. Due to the variations in hardware and/or software configuration, the operational stability of each client may differ in response to the installation of the new update. As such, some clients may run the new version of the application without any adverse effects, while other clients may undergo degradation in computing performance. Selecting which clients to provide newer versions of the application at random may result in degradation in performance at some clients. Additionally, customer complaint reports may not objectively reflect computer performance at clients, and may thus also result in suboptimal selection of clients to provide newer versions of the application.

To reduce degradation in computer performance and minimize any other adverse impact from the newer versions of the application, the present systems and methods provide for a canary deployment distribution based on operational statistics and analytics of the recipient clients. In accordance with a distribution schedule, an application deployment system may query a first set of clients for an operational health statistic. Each of the first set of clients may have already received and installed a new version of the application. Upon receipt of the query, each client of the first set of clients may determine the operational health statistic by identifying various properties of invocations of predetermined callbacks (e.g., web hooks using HTTP POST) for the newly updated application. Such various properties for each predetermined callback may include a number of invocations, a number of errors, and a completion time, among others. These properties may be indicative of the operational health statistic of the client of the first set of clients. Once determined, each client of the first set of clients may send a response including the operational health statistic to the application deployment system.

Using the operational health statistic compiled from the first set of clients, the application deployment system may determine whether to push the newer version of the application to a second set of clients. The application deployment system may calculate an operational health statistic indicative of the aggregate operational statistic for the first set of clients that have already received and installed the new version of the application. The application deployment system may then compare the operational health statistic indicative of the aggregate operational statistic for the first set of clients to a health threshold. If the operational health statistic is greater than the health threshold signifying a lack of adverse effects from the new version of the application, the application deployment system may provide the new version to the second set of clients. The application deployment system may also increment a deployment counter to the next set of clients. If the operational health statistic is lower than or equal to the health threshold signifying an existence of adverse effects from the new version of the application, the application deployment system may withhold distribution of the new version to the second set of clients and signal an alert to an administrator. The application deployment system may also wait until the next designated time in accordance to the distribution schedule to determine whether to push the newer version.

Figure 2:
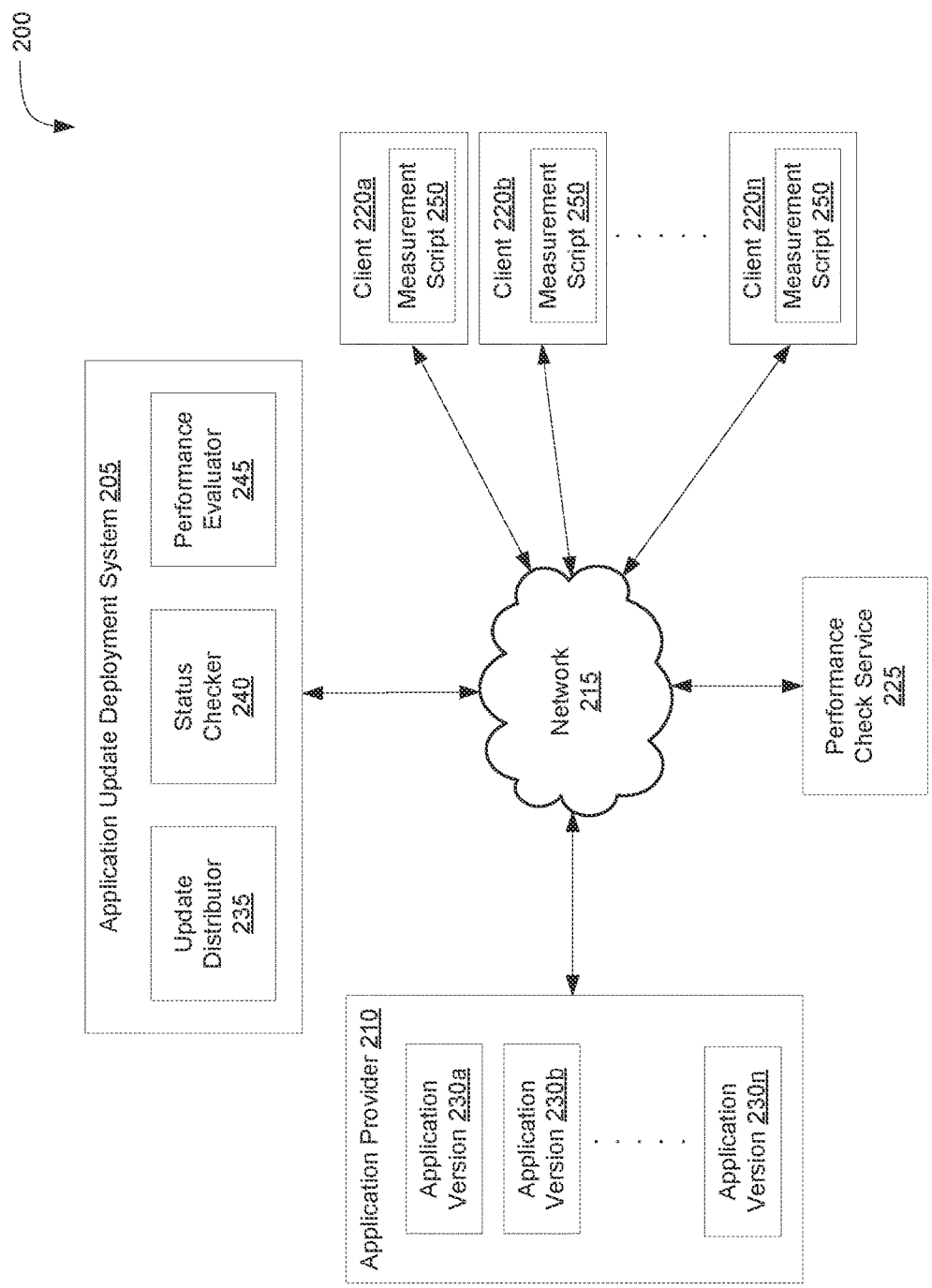
FIG. 2 is a block diagram of an embodiment of a system for deploying software updates to multiple clients.

Referring now to FIG. 2, depicted is a block diagram of an embodiment of a system 200 for deploying software updates to multiple clients. In brief summary, the system 200 may include an application update deployment system 205, an application provider 210, one or more clients 220a-n, and a performance check service 225. The application update deployment system 205, the application provider 210, and the one or more clients 220a-n may be communicatively coupled or connected to another (e.g., via a network 215). The application provider 210 may be a cloud-based service that, via the application update deployment system 205, deploy updates or cause updates to be deployed to application instances to the one or more clients 220a-n via the cloud or one or more other networks.

The application update deployment system 205 may include an update distributor 235, a status checker 240, and a performance evaluator 245, among others. In some embodiments, the update distributor 235, the status checker 240, and the performance evaluator 245 may be part of the application update deployment system. The application provider 210 may include or store one or more application versions 230a-n. Each client 220a-n may include a measurement script 250. Each client 220a-n may be associated with one or more entities (e.g., user accounts).

Each of the above-mentioned elements or entities is implemented in hardware, or a combination of hardware and software, in one or more embodiments. Each component of the system 200 may be implemented using hardware or a combination of hardware or software detailed above in connection with FIG. 1. For instance, each of these elements or entities can include any application, program, library, script, task, service, process or any type and form of executable instructions executing on hardware of the application update deployment system 205, the application provider 210, and the one or more clients 220a-n. The hardware includes circuitry such as one or more processors in one or more embodiments.

In further detail, the application provider 210 may store or otherwise include one or more versions 230a-n of an application. In some embodiments, the application provider 210 may include a database for storing the one or more application versions 230a-n. Each application version 230a-n may correspond to software, a set of instructions, or otherwise computer-readable executable code for execution at the one or more clients 220a-n. In some embodiments, each application version 230a-n may include or may be provided with the measurement script 250 to keep track of various metrics on predetermined callbacks (e.g., function calls). In some embodiments, each client 220a-n may have some version 230a-n of the application installed. Each application version 230a-n may correspond to an identifier, such as a version name or identifier. Each application version 230a-n may correspond to a later or newer version of the application. In some embodiments, each application version 230a-n may correspond to a production version of the application. In some embodiments, each application version 230a-n may correspond to a test or pilot version of the application. Each application version 230a-n may include functionalities or features different from other application versions 230a-n. For example, a test version of the application may include new features lacking in a production version of the application. Different versions of the application 230a-n may be rolled out in accordance with a distribution schedule.

To roll out different versions of the application 230a-n to the clients 220a-n, the update distributor 235 of the application update deployment system 205 may identify a current time to compare with a distribution schedule. The distribution schedule may specify a set of predetermined times to provide a designated application version 230a-n (referred hereinafter as designated application version 230). Each time of the set of predetermine time may indicate which set of clients 220a-n (sometimes referred to as deployment groups). The set of predetermined times may be assigned by an administrator of the application update deployment system 205 or an administrator of the application provider 210. In some embodiments, the distribution schedule may be stored and maintained at the application provider 210. In some embodiments, the distribution schedule may be stored and maintained at a database on the application update deployment system 205. The update distributor 235 may maintain a timer to keep track of the current time. The update distributor 235 may compare the identified current time with the sets of times of the distribution schedule. If the current time is determined not to match any of the times of the distribution schedule, the update distributor 235 may wait until the current time is determined to match one of the times of the distribution schedule.

If the current time is determined to match one of the times of the distribution schedule, the update distributor 235 may identify the designated application version 230. In some embodiments, the update distributor 235 may access the application provider 210 to identify the designated application version 230. The application provider 210 may maintain a reference address identifying the designated application version 230. The update distributor 235 may identify a next set of clients 220a-n to provide the designated application version 230. In some embodiments, the update distributor 235 may identify a next set of reference address each corresponding to a client of the next set of clients 220a-n to provide the designated application version 230. In some embodiments, the update distributor 235 may determine whether the identified set of clients 220a-n is the first set of clients 220a-n to receive the designated application version 230. If none of the clients 220a-n have received and/or executed the designated application version 230, the update distributor 230 may provide the designated application version 230 without any further determinations. Otherwise, if the identified set is determined not to be the first set of clients 220a-n to receive and execute the designated application version 230, the update distributor 235 may proceed to determine whether to provide the designated application version 230 to the identified set of clients 220a-n based on the operational health of a previous set of clients 220a-n that have received the designated application version 230. The determination of whether to provide the application version 230 to the set of clients 220a-n is detailed below.

In accordance with the distribution schedule, the status checker 240 of the application update deployment system 205 may gather responses indicating operational health of the previous set of clients 220a-n that have received the designated application version 230. The status checker 240 may identify the previous set of clients 220a-n that have received and executed the designated application version 230 based on the distribution schedule. As discussed above, the distribution schedule may specify a set of predetermined times to provide the designated application version 230a-n to sets of clients 220a-n. In some embodiments, the status checker 240 may identify all clients 220a-n that have received and executed the designated application version 230 from the distribution schedule. In some embodiments, the status checker 240 may identify an immediately previous set of clients 220a-n that have received and executed the designated application version 230 from the distribution schedule.

Once identified, the status checker 240 may transmit a request to check a status via the network 215 to each client 220a-n of the previous set of clients 220a-n that have received and executed the designated application version 230. The request may specify to each client 220a-n one or more metrics the client 220a-n is to send back to the status checker 240. The request may specify one or more predetermined callbacks (e.g., function call) are to be reported by the client 220a-n. In some embodiments, the one or more predetermined callbacks may be designed by the administrator of the application provider 210 or the application update deployment system 205. The one or more predetermined callbacks may correspond to function calls for features newly added with the designated application version 230. In some embodiments, the one or more predetermined callbacks may correspond to satisfying of a predetermined condition. The predetermined condition may specify to a set of function calls (e.g., web hooks) invoked by the designated application version 230. The one or more predetermined callbacks may also correspond to function calls for features frequently used across application versions 230a-n provided by the application provider 210. The one or more metrics may include a number of invocations of each predetermined callback, a number of errors from the invocations of the predetermined callback, a frequency of invocations of the predetermined callback, a timestamp for each invocation, and a completion time for each invocation of the predetermined callback at the client 220a-n, among others.

The client 220a-n may already have installed with and may be executing the measurement script 250 to keep track of the metrics of the predetermined callbacks of the designated application version 230. In some embodiments, the measurement script 250 may be part of and provided with the designated application version 230. In some embodiments, the measurement script 250 may be separate from the designated application version 230, and may interface with the designated application version 230 to keep track of the metrics. The measurement script 250 may maintain one or more metrics for all the predetermined callbacks (e.g., function calls) of the designated application version 230. As the designated application version 230 is running on the client 220a-n, the measurement script 250 may detect a callback matching one of the predetermined callbacks. Once the callback matching one of the predetermined callbacks is detected and carried out, the measurement script 250 may identify the one or more metrics for the detected callback. In some embodiments, the measurement script 250 may update the one or more metrics for the detected callback. The measurement script 250 may increment the number of invocations for the predetermined callback. The measurement script 250 may determine whether any error has occurred responsive to invocation of the predetermined callback. In some embodiments, the measurement script 250 may detect the invocation of an exception from the predesignated application version 230. Based on detection of the error, the measurement script 250 may increment the number of errors for the predetermined callback. The measurement script 250 may identify a timestamp at which the invocation of the predetermined callback was detected, and may record the timestamp on memory. The measurement script 250 may determine the completion time of each invocation of the predetermined callback. In some embodiments, the measurement script 250 may store the one or metrics for the detected callback on memory of the client 220a-n. In some embodiments, the measurement script 250 may send the one or metrics for all the predetermined callbacks to the performance check service 225. In some embodiments, the measurement script 250 may send the one or more metrics for the detected callback to the performance check service 225, each time the callback is detected.

Upon receipt of the request to check the status, the client 220a-n may identify the one or more metrics of the one or more predetermined callbacks. In some embodiments, the client 220a-n may access memory to retrieve the one or more metrics for the one or more predetermined callbacks determined by the measurement script 250. In some embodiments, responsive to the request to check the status, the measurement script 250 may compile the one or more metrics for each corresponding predetermined callback. The measurement script 250 may determine the frequency of invocations of each predetermined callback from the recorded timestamps for the predetermined callback. The measurement script 250 may determine an error frequency from the number of errors for each predetermined callback. Having compiled the one or more metrics for the one or more predetermined callbacks, the client 220a-n may generate a response indicative of the operational health of the client 220a-n subsequent to receipt of the designated application version 230. The response may include the one or more metrics for each of the predetermined callbacks. The response may also include a device identifier corresponding to the client 220a-n and a version number corresponding to the application version 230 running on the client 220a-n, among others. The client 220a-n may then transmit the response indicative of the operation health of the client 220a-n to the status checker 240 via the network 215.

Subsequently, the status checker 240 may receive the response from at least one client 220a-n of the previous set of clients 220a-n that have received and executed the designated application version 230. In some embodiments, the status checker 240 may aggregate the responses received from the previous set of clients 220a-n. The status checker 240 may store the responses for each of the clients of the previous set of clients 220a-n. In some embodiments, the status checker 240 may send a request for the one or more metrics for the one or more predetermined callbacks at each client of the previous set of clients 220a-n to the performance check service 225. In some embodiments, the status checker 240 may receive a response from the performance check service 225. The response received from the performance check service 225 may be similar to the response received from the client 220a-n, and may include the one or more metrics for each of the predetermined callbacks. The response may also include a device identifier corresponding to the client 220a-n and a version number corresponding to the application version 230 running on the client 220a-n, among others.

Based on the responses from the previous set of clients 220a-n, the performance evaluator 245 of the application update deployment system 205 may determine an operational health statistic for the previous set of clients 220a-n subsequent to receiving and executing the designated application version 230. The operational health statistic may be any numerical value (e.g., ranging from 0 to 100, 0 to 10, 0 to 1, −100 to 100, −10 to 10, or −1 to 1, etc.) indicative of an aggregate operational health of the previous set of clients 220a-n that have received and executed the designated application version 230 provided by the application provider 210. The performance evaluator 245 may calculate the operational health statistic based on a combination of the one or more metrics for each of the one or more predetermined callbacks over the previous set of clients 220a-n. The combination of the one or more metrics for each of the one or more predetermined callbacks may include an average or a weighted average over the previous set of clients 220a-n. In some embodiments, the performance evaluator 245 may calculate a constituent operational health statistic for each client 220a-n of the previous set. Using the constituent operational health statistics, the performance evaluator 245 may calculate the aggregate operational health statistic for the previous set of clients 220a-n. In some embodiments, the performance evaluator 245 may calculate a variance the one or more metrics for each of the one or more predetermined call backs included in the responses from the previous set of clients 220a-n. In some embodiments, the performance evaluator 245 may calculate a variance of the constituent operational health statistics for each client of the previous set of clients 220a-n.

The performance evaluator 245 may determine whether the operational health statistic and the one or more metrics from the previous set of clients 220a-n satisfy a predetermined threshold. The predetermined threshold may correspond to one or more conditions that the operational health statistic is to satisfy prior to distribution of the designated application version 230 to the next set of clients 220a-n. In some embodiments, the performance evaluator 245 may compare the operational health statistic for the previous set of clients 220a-n to the predetermined threshold. In some embodiments, the performance evaluator 245 may compare the one or more metrics from the previous set of clients 220a-n to the predetermined threshold. In some embodiments, the predetermined threshold may specify a minimum number of invocations of each predetermined callback, a minimum number of errors from the invocations of the predetermined callback, a minimum frequency of invocations of the predetermined callback, and a minimum completion time for each invocation of the predetermined callback. In some embodiments, the performance check service 225 may perform the same functionalities of the performance evaluator 245. The performance check service 225 may be a computing device maintained by a separate entity to determine the operational health statistic of the previous set of clients 220a-n. The performance evaluator 245 may send a request for the operational health statistic to the performance check service 225, and may subsequently receive the operational health statistic from the performance check service 225.

In some embodiments, the performance evaluator 245 may determine the predetermined threshold based on responses from a set of clients 220a-n that were provided with the designated application version 230 earlier than the previous set of clients 220a-n. In some embodiments, the determination may be based on the responses from the very first set of clients 220a-n to receive the designated application version 230. Each time responses to the request to check the status are received from the clients 220a-n, the performance evaluator 245 may store the one or more metrics for the one or more predetermined callbacks on the application update deployment system. The performance evaluator 245 may calculate the predetermined threshold as a combination of the one or more metrics for the one or more predetermined callbacks. The combination of the one or more metrics for each of the one or more predetermined callbacks may include an average or a weighted average over the earlier set of clients 220a-n. The performance evaluator 245 may calculate the predetermined threshold as a predefined percentage of the average or the weighted average of the one or more metrics from the earlier set of clients 220a-n. In some embodiments, the performance evaluator 245 may update the predetermined threshold, each time the responses to the request to check status are received.

If the operational health statistic is determined not to satisfy the predetermined threshold, the update distributor 235 may restrict further distribution of the designated application version 230. In some embodiments, responsive to the determination, the update distributor 235 may also provide an alert to the administrator of the application provider 210 of the application update deployment system 205. The alert may include a graphical user interface (e.g., a prompt) notifying the administrator that the designated application version 230 may not be running properly on the previous set of clients 220a-n. In some embodiments, the update distributor 235 may modify the distribution schedule for providing the designated application version 230, responsive to the determination. The update distributor 235 may delay a time for a next set of clients 220a-n that is to receive the designated application version 230. The update distributor 235 may set a time in the distribution schedule to resend a request to check status of the previous set of clients 220a-n. The update distributor 235 may wait until the operational health statistic for the previous set of clients 220a-n satisfies the predetermined threshold, prior to providing the designated application version 230 to the next set of clients 220a-n.

Conversely, if the operational health statistic is determined to satisfy the predetermined threshold, the update distributor 235 may provide the designated application version 230 to the next set of clients 220a-n. In some embodiments, the update distributor 235 may identify the next set of clients 220a-n from the distribution schedule. As discussed previously, the distribution schedule may specify a set of predetermined times to provide the designated application version 230. Each time of the set of predetermine time may indicate which set of clients 220a-n. In some embodiments, the update distributor 235 may maintain a deployment counter. The deployment counter may correspond to a number of sets of clients 220a-n the designated application version 230 has been provided to. In some embodiments, responsive to the determination, the update distributor 235 may increment the deployment counter. In some embodiments, the update distributor 235 may invoke a separate software deployment service (e.g., the application provider 210) to provide the designated application version 230 to the next set of clients 220a-n. In some embodiments, the performance evaluator 245 may compare the variance of the constituent operational health statistics used to calculate the aggregate operational health statistic with a predefined threshold variance. If the variance is determined to be greater than the predefined threshold variance, the update distributor 235 may restrict further distribution of the designated application version 230 until the variance becomes less than the predefined threshold variance. If the variance is determined to be greater than the predefined threshold variance, the update distributor 235 may proceed to distribute the designated application version 230 to the next set of clients 220a-n.

The functionalities of the application update deployment system 205 may be repeated over subsequent sets of clients 220a-n. By using the operational health statistic of the previous sets of clients 220a-n executing the designated application version 230, the application update deployment system 205 may limit degradation in computing performance as well as other adverse impacts of new features in the designated application version 230.

Figure 3:
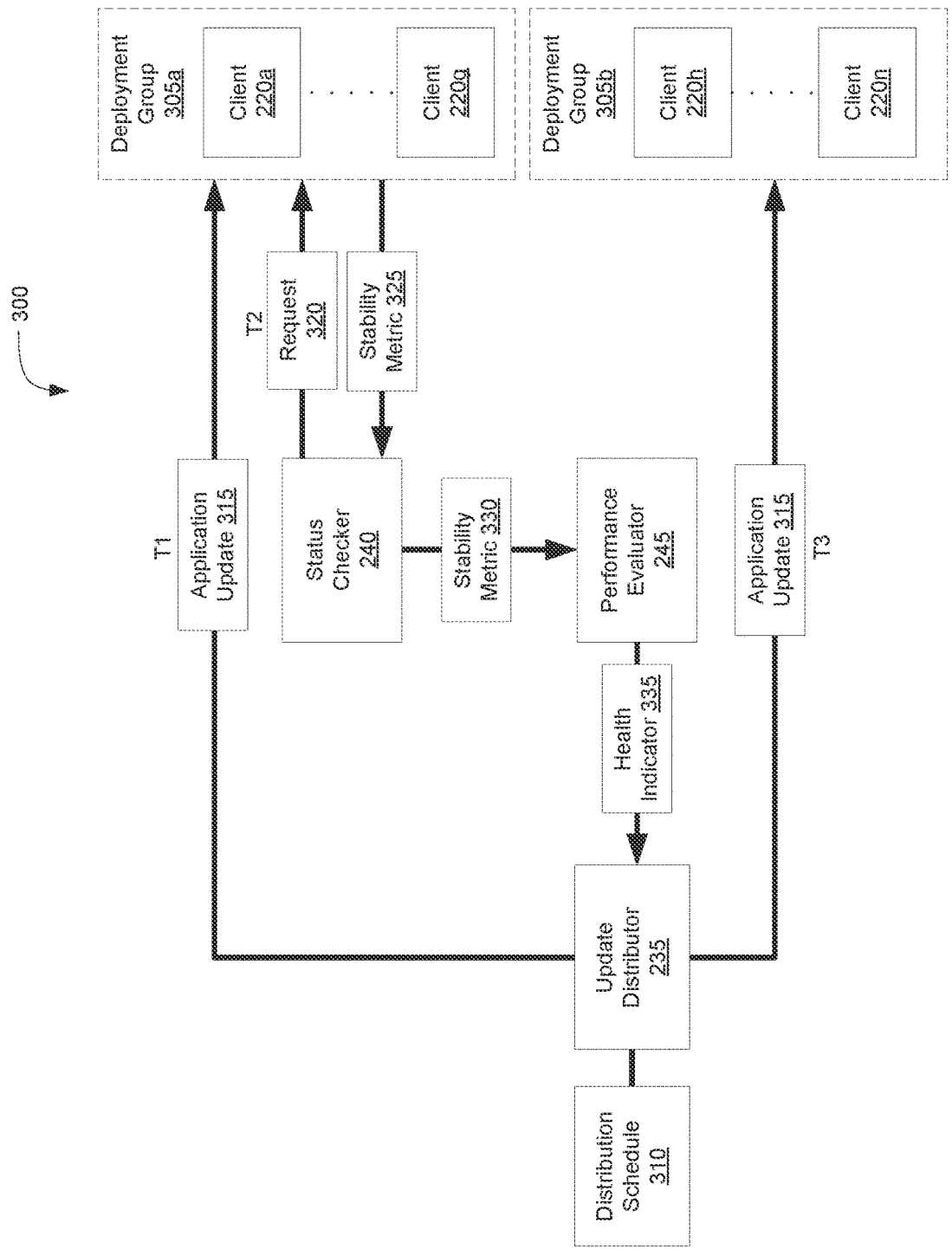
FIG. 3 is a sequence diagram of an embodiment for a system for deploying software updates to multiple clients.

Referring now to FIG. 3, depicted is a sequence diagram of an embodiment for a system 300 for deploying software updates to multiple clients. Each component of the system 300 may be implemented using hardware or a combination of hardware or software detailed above in connection with FIG. 1 and FIG. 2. In the context of FIG. 2, at time $T_1$, the update distributor 235 may distribute an application update 315 to a first deployment group 305a in accordance to a distribution schedule 310. The first deployment group 305a may include a subset of clients 220a-g. At some point later at time $T_2$, the status checker 240 may send a request 320 to check the status to the clients 220a-g of the first deployment group 305a. The clients 220a-g of the first deployment group 305a may in turn send a response with stability metric 325 back to the status checker 240. The status checker 240 may then aggregate the responses from the clients 220a-g of the first deployment group 305a, and may relay the aggregated stability metrics 330 to the performance evaluator 245. The performance evaluator 245 may then determine whether the stability metrics satisfy a predetermined condition. If the predetermined condition is determined to be satisfied, the performance evaluator 245 may relay an indicator 335 to the update distributor 235. The update distributor 235 in response may distribute the application update 315 at time 73 to a second deployment group 305b that may include clients 220h-n.

Figure 4:
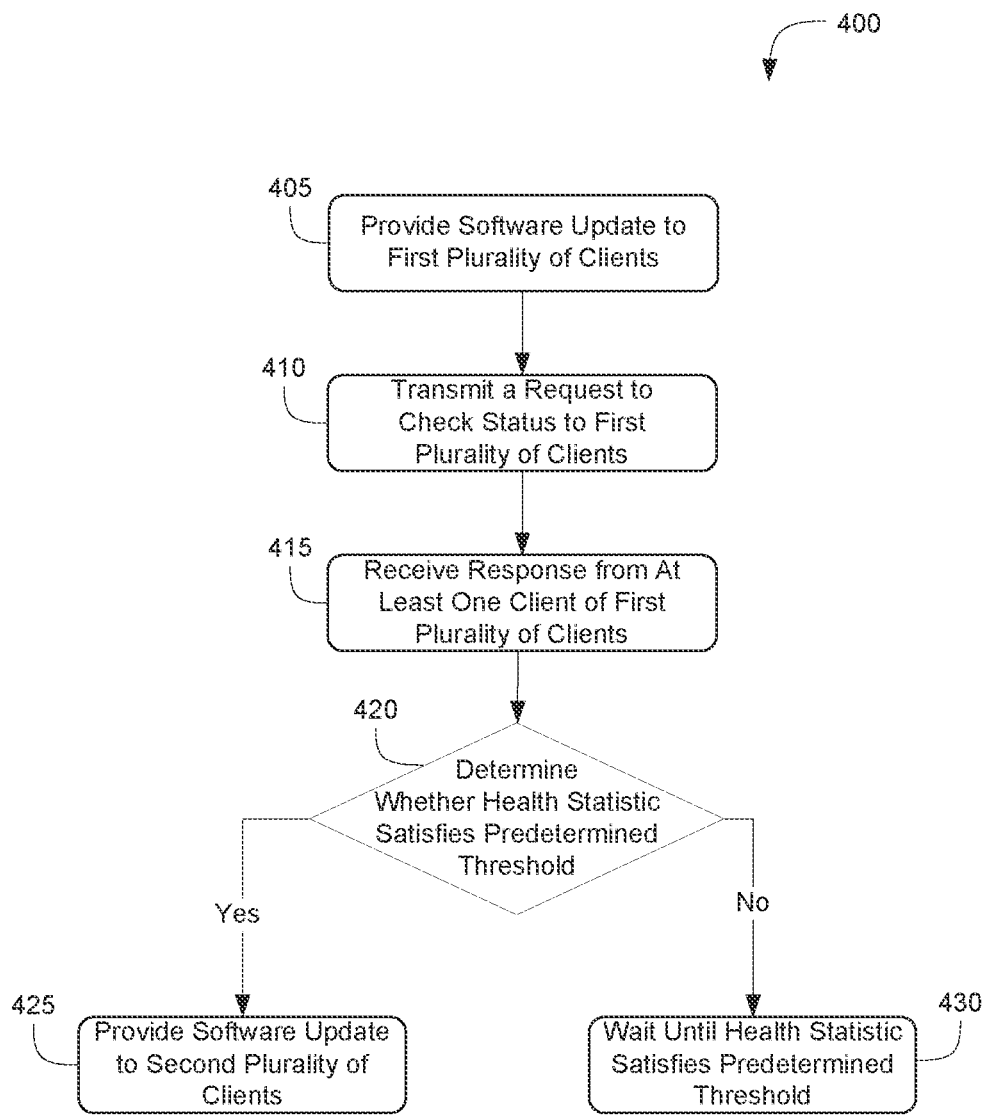
FIG. 4 is a flow diagram of an embodiment of a method for deploying software updates to multiple clients.

Referring now to FIG. 4 depicted is a flow diagram of an embodiment of a method 400 for deploying software updates to multiple clients. The operations and functionalities of the method 400 may be performed by the components described in FIG. 1 and FIG. 2, the system 200, and/or the system 300 detailed above. In brief overview, a device may provide a software update to a first plurality of clients (405). The device may transmit a request to check status to the first plurality of clients (410). The device may receive a response from at least one client of the first plurality of clients (415). The device may determine whether an operational health statistic satisfies a predetermined threshold (420). If the operational health statistic is determined to satisfy the predetermined threshold, the device may provide the software update to the second plurality of clients (425). On the other hand, if the operational health statistic is determined not to satisfy the predetermined threshold, the device may wait until the stability metric satisfies the predetermined threshold to provide the software update (430).

In further overview, the device may provide a software update to a first plurality of clients (405). The software update may correspond to a version of an application different from that of the application currently installed at each client of the first plurality of clients, and may include different features. The device may provide the software update to the first plurality of clients in accordance with a distribution schedule. The distribution schedule may specify when each set of clients is to receive the software update.

The device may transmit a request to check status to the first plurality of clients (410). The request may specify which metrics and which callbacks the client is to report back to the device. The device may already have been installed with a measurement script with the application running thereon. The measurement script can keep track of the metrics and the callbacks, as well as other operational statistics, of the application. The metrics may include a number of invocations of each predetermined callback, a number of errors from the invocations of the predetermined callback, a frequency of invocations of the predetermined callback, a timestamp for each invocation, and a completion time for each invocation of the predetermined callback at the client 220a-n, among others.

The device may receive a response from at least one client of the first plurality of clients (415). In response to receiving the request to check status, each client of the first plurality of clients may identify the metrics for the callbacks specified by the request. The client may also generate the response to include the metrics for the callbacks identified using the measurement script. Once generated, the client may send back the response to the client. The device in turn may aggregate the responses over the first plurality of clients.

The device may determine whether an operational health statistic satisfies a predetermined threshold (420). Using the responses aggregated from the first plurality of clients, the device may calculate the operational health statistic. The operational health statistic may be calculated from a combination (e.g., a weighted average) of the metrics for the predetermined callbacks specified by the request to check the status. The predetermined threshold may correspond to conditions that the operational health statistic is to satisfy prior to distribution of the software update to the next set of clients.

If the operational health statistic is determined to satisfy the predetermined threshold, the device may provide the software update to the second plurality of clients (425). The device may identify the second plurality of clients from the distribution schedule. The device may invoke a separate software distribution service to provide the software update to the second plurality of clients. Once received, each client of the second plurality of clients may install the software update and may execute the application with the software update.

On the other hand, if the operational health statistic is determined not to satisfy the predetermined threshold, the device may wait until the stability metric satisfies the predetermined threshold to provide the software update (430). The device may also provide an alert to the administrator of the distribution of the software update. The device may further alter the distribution schedule to delay further deployment of the software update to other clients.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising:
identifying, by the device, a threshold for one or more metrics of operation of a first one or more clients of a plurality of clients using a software update, the threshold is to be satisfied before the device is to provide the software update to a second one or more clients of the plurality of clients;
providing, by the device, the software update to the first one or more clients to cause each of the first one or more clients to execute the software update;
receiving, by the device, the one or more metrics of one or more predetermined function calls from each of the first one or more clients;
determining, by the device based at least on the one or more metrics, that the threshold is satisfied; and
providing, by the device responsive to determining that the threshold is satisfied, the software update to the second one or more clients to cause each of the second one or more clients to execute the software update,
wherein the one or more metrics reported by each client of the first one or more clients using the software update are from invocations of the one or more predetermined function calls associated with the software update.

2. The method of claim 1, further comprising selecting, by the device, the first one or more clients from the plurality of clients to receive the software update based at least on one of a hardware or software configuration of the first one or more clients.

3. The method of claim 1, providing, by the device, the software update to the first one or more clients according to a distribution schedule for the plurality of clients and changing the distribution schedule based at least on determining that the threshold is satisfied.

4. The method of claim 1, further comprising comparing, by the device, the threshold to an aggregation of the one or more metrics from the first one or more clients.

5. The method of claim 1, wherein the one or more metrics comprises an invocation time and completion time of the one or more predetermined function calls.

6. The method of claim 1, wherein the one or more metrics comprises a number and frequency of invocation of the one or more predetermined function calls and a number of errors from the invocation of the one or more predetermined function calls.

7. The method of claim 1, further comprising communicating, by the device, a request to each of the first one or more clients to report the one or more metrics and responsive to the request, receiving the one or more metrics from the one or more predetermined function calls.

8. A system comprising:
one or more processors, coupled to memory and configured to:
identify a threshold for one or more metrics of operation of a first one or more clients of a plurality of clients using a software update, wherein the threshold is to be satisfied before the device is to provide the software update to a second one or more clients of the plurality of clients;
provide the software update to the first one or more clients to cause each of the first one or more clients to execute the software update;
receive the one or more metrics of one or more predetermined function calls from each of the first one or more clients;
determine, based at least on the one or more metrics, that the threshold is satisfied; and
provide, responsive to determining that the threshold is satisfied, the software update to the second one or more clients to cause each of the second one or more clients to execute the software update,
wherein the one or more metrics reported by each client of the first one or more clients using the software update are from invocations of the one or more predetermined function calls associated with the software update.

9. The system of claim 8, wherein the one or more processors are further configured to select the first one or more clients from the plurality of clients to receive the software update based at least on one of a hardware or software configuration of the first one or more clients.

10. The system of claim 8, wherein the one or more processors are further configured to provide the software update to the first one or more clients according to a distribution schedule for the plurality of clients and change the distribution schedule based at least on determining that the threshold is satisfied.

11. The system of claim 8, wherein the one or more processors are further configured to compare the threshold to an aggregation of the one or more metrics from the first one or more clients.

12. The system of claim 8, wherein the one or more metrics comprises an invocation time and completion time of the one or more predetermined function calls.

13. The system of claim 8, wherein the one or more metrics comprises a number and frequency of invocation of the one or more predetermined function calls and a number of errors from the invocation of the one or more predetermined function calls.

14. The system of claim 8, wherein the one or more processors are further configured to communicate a request to each of the first one or more clients to report the one or more metrics and responsive to the request, receive the one or more metrics from the one or more predetermined function calls.

15. A non-transitory computer-readable medium storing instructions that, when executed by one or more processors, cause the one or more processors to:
identify a threshold for one or more metrics of operation of a first one or more clients of a plurality of clients using a software update, wherein the threshold is to be satisfied before the device is to provide the software update to a second one or more clients of the plurality of clients;
provide the software update to the first one or more clients to cause each of the first one or more clients to execute the software update;
receive the one or more metrics of one or more predetermined function calls from each of the first one or more clients;
determine, based at least on the one or more metrics, that the threshold is satisfied; and
provide, responsive to determining that the threshold is satisfied, the software update to the second one or more clients to cause each of the second one or more clients to execute the software update,
wherein the one or more metrics reported by each client of the first one or more clients using the software update are from invocations of the one or more predetermined function calls associated with the software update.

16. The non-transitory computer-readable medium of claim 15, wherein the one or more metrics comprises an invocation time and completion time of the one or more predetermined function calls.

17. The non-transitory computer-readable medium of claim 15, wherein the one or more metrics comprises a number and frequency of invocation of the one or more predetermined function calls and a number of errors from the invocation of the one or more predetermined function calls.

* * * * *